United States Patent
Wang et al.

(10) Patent No.: US 12,293,543 B1
(45) Date of Patent: May 6, 2025

(54) COMPUTER VISION TECHNIQUES USING PROJECTIONS OF MAP DATA INTO IMAGE DATA

(71) Applicant: Zoox, Inc., Foster City, CA (US)

(72) Inventors: Xin Wang, Sunnyvale, CA (US); Xinyu Xu, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 322 days.

(21) Appl. No.: 18/068,329

(22) Filed: Dec. 19, 2022

(51) Int. Cl.
| | | |
|---|---|---|
| *G06T 7/73* | (2017.01) | |
| *B60W 40/04* | (2006.01) | |
| *B60W 60/00* | (2020.01) | |
| *G01C 21/30* | (2006.01) | |
| *G06T 7/11* | (2017.01) | |
| *G06T 7/50* | (2017.01) | |

(52) U.S. Cl.
CPC ............... *G06T 7/74* (2017.01); *B60W 40/04* (2013.01); *B60W 60/001* (2020.02); *G01C 21/30* (2013.01); *G06T 7/11* (2017.01); *G06T 7/50* (2017.01); *B60W 2420/403* (2013.01); *G06T 2207/20081* (2013.01); *G06T 2207/30252* (2013.01)

(58) Field of Classification Search
CPC ..... G06T 7/11; G06T 7/50; G06T 7/73; G06T 7/74; G06T 2207/20081; G06T 2207/30252; G06T 2420/403; B60W 40/04; B60W 60/001; G01C 21/30
USPC .......................................................... 701/28
See application file for complete search history.

(56) References Cited

U.S. PATENT DOCUMENTS

| | | | | |
|---|---|---|---|---|
| 9,151,626 | B1 * | 10/2015 | Kojo ...................... | G01C 21/30 |
| 12,175,595 | B2 * | 12/2024 | Serafin .................... | G06T 17/00 |
| 2022/0144305 | A1 * | 5/2022 | Ren ........................ | B60W 40/114 |
| 2023/0351703 | A1 * | 11/2023 | Hayashi .................. | G06T 11/60 |
| 2024/0087092 | A1 * | 3/2024 | Nayak ..................... | G06F 16/29 |

* cited by examiner

*Primary Examiner* — Andrew Joseph Rudy
(74) *Attorney, Agent, or Firm* — Lee & Hayes, P.C.

(57) ABSTRACT

Techniques for performing computer vision operations for a vehicle using image data of an environment of the vehicle are described herein. In some cases, a vehicle (e.g., an autonomous vehicle) can determine a predicted position (including a predicted depth) and/or a predicted trajectory for an object in the vehicle environment based on data generated by projecting a map object described by the map data for a vehicle environment to image data of the vehicle environment.

20 Claims, 7 Drawing Sheets

COMPUTER VISION TECHNIQUES USING PROJECTIONS OF MAP DATA INTO IMAGE DATA

BACKGROUND

Autonomous vehicles perform computer vision operations such as depth estimation and object detection. However, computer vision operations can be inaccurate and/or inefficient, which can present challenges when controlling the autonomous vehicle through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
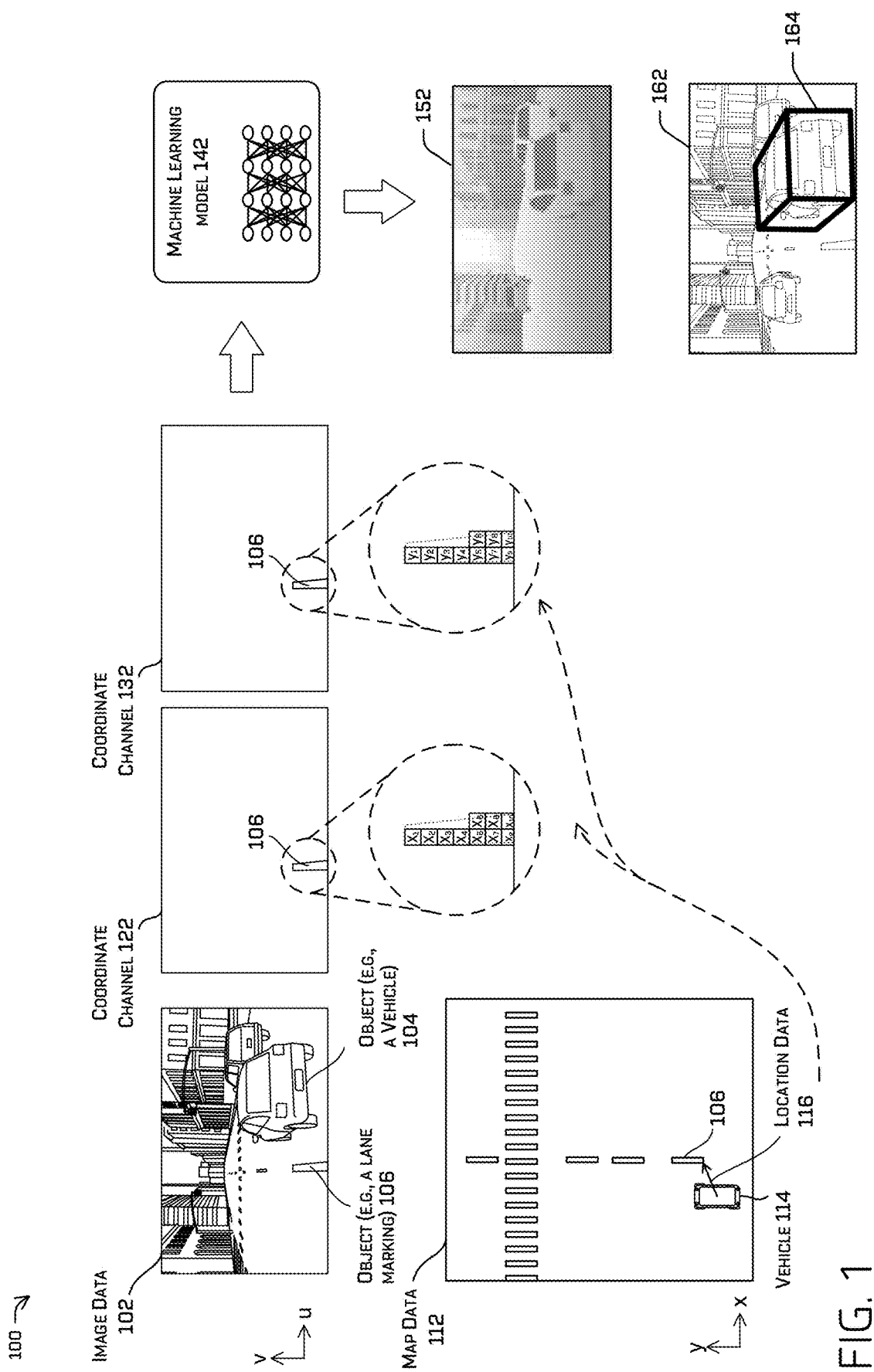
FIG. 1 illustrates an example architecture for implementing the techniques for performing computer vision operations using image data and map data of a vehicle environment.

Techniques for performing computer vision operations for a vehicle using image data of an environment of the vehicle and map data of the vehicle environment are described herein. The described techniques may enable predicting positions and/or trajectories of objects (e.g., vehicles, lane markings, crosswalks, traffic lights, etc.) within the vehicle and controlling the vehicle based on the described predictions to increase the likelihood that the vehicle is operated in compliance with relevant traffic regulations and avoids collision with other objects in the vehicle environment. Accordingly, the techniques discussed herein may improve the safety of occupants of an autonomous vehicle that incorporates the techniques discussed herein. Moreover, the techniques may improve the efficiency of vehicle, such as an autonomous vehicle, in accomplishing a mission such as, for example, delivering passengers and/or cargo, surveying a region, or the like.

According to the techniques discussed herein, a vehicle can determine a predicted position (including a predicted depth) and/or a predicted trajectory for an object in the vehicle environment based on data generated by projecting a map object to image data of the vehicle environment. For example, when the vehicle receives the image data of the vehicle environment as captured by the image sensor of the vehicle, the autonomous vehicle may project map data associated with the vehicle environment into the image data to determine a projection region in the image data for a map object. The vehicle may then generate one or more coordinate channels that associate the projection region with coordinates of the map object in the map data. The coordinate channels may then be inputted into a machine learning model that is configured to generate one or more model outputs for the image data of the environment, such as at least one of a depth map for the image data or bounding box feature data for an object that is detected within the image data. The model output data generated by the machine learning model can then be used to control the vehicle.

In some cases, the techniques discussed herein include projecting a map object as described by the map data for a vehicle environment into image data for the vehicle environment. The image data for the vehicle environment may be captured by one or more image sensors (e.g., a visible light spectrum camera, an infrared camera, etc.) of the vehicle. The map data may be generated by receiving or determining an estimated location of the vehicle within the map data and detecting one or more map objects described in the map data that are estimated to be within a line of sight of the estimated vehicle location. In some cases, the image data includes monocular image data captured by a monocular camera without corresponding measured depth data.

For example, the techniques discussed herein may include determining (e.g., based on estimated coordinates detected by a localization system (e.g., inertial measurement unit (IMU)-based, lidar based, global positioning system (GPS)-based, etc.) associated with the vehicle) that the vehicle is estimated to be in a map location that is associated with the map coordinates $(x_v, y_v)$. The techniques may further include determining that a point in the map data having the map coordinates $(x_o, y_o)$ is associated with a map object (e.g., a map object corresponding to a crosswalk) that is estimated to be within a field of view of the vehicle. In this example, the techniques discussed herein may include projecting the map coordinates $(x_o, y_o)$ into a pixel in the image data that is associated with the image coordinates $(u_o, v_o)$ in the image data. This projection may be performed because, unlike the map data that is associated with an x-y coordinate system (e.g., the geographic coordinate system), the image data may be captured from a point of view of an image sensor of the vehicle and thus may associated with a different u-v coordinate system whose origin may be a location of the image sensor.

Accordingly, the techniques discussed herein may include projecting map coordinates for those map points that are associated with a map object to image coordinates within the image data. Thus, if a map object is associated with n points in the map data, the n points may be projected to up to n pixel in the image data that collectively form a projection region for the map object. Accordingly, the projection region for a map object may represent the map object at image coordinates within the image data. In some cases, projecting a map object into the image data is performed based on a first pixel of the image data that corresponds to ground.

In some cases, the techniques discussed herein include generating one or more coordinate channels for a vehicle environment based on the detected projection regions in the image data of the vehicle environment. As described above, one or more map objects represented by map data of the vehicle environment may be projected to one or more projection regions in the image data of the vehicle environment, with each projection region being associated with a corresponding map object and representing the map object at image coordinates within the image data. In some cases, after one or more map objects are projected to one or more respective projection regions in the image data, each pixel of the image data is either a projection pixel (e.g., a pixel that is estimated to depict a map point in a map object that is projected into the image data) or a non-projection pixel (e.g., a pixel that is estimated to not depict a map point in a map object that is projected into the image data).

In some cases, the coordinate channels describe which pixels of the image data are projection pixels and, for each projection pixel, the coordinates of the map point that is projected into the projection pixel. For example, if a map point having the map coordinates $(x_o, y_o)$ is mapped into a projection pixel $(u_o, v_o)$ in the image data, then the coordinate channels may represent that the pixel $(u_o, v_o)$ in the image data is a projection pixel and is associated with the map point $(x_o, y_o)$. In some cases, if image data of the vehicle environment includes an image having the dimensions M×N (e.g., having M×N pixels arranged in M rows and N columns), then the coordinate channels for the vehicle environment may include a horizontal coordinate channel that is an M×N matrix whose (i,j)th matrix value is: (i) $x_o$ if the (i,j)th pixel of the image data is a projection pixel that is estimated to depict a map point $(x_o, y_o)$ of a projected map object, and (ii) a null value (e.g., a zero value) if the (i,j)th pixel of the image data is a non-projection pixel. In some cases, in addition to or instead of the horizontal coordinate channel described above, the coordinate channels for the vehicle environment may include a vertical coordinate channel that is an M×N matrix whose (i,j)th matrix value is: (i) $y_o$ if the (i,j)th pixel of the image data is a projection pixel that is estimated to depict a map point $(x_o, y_o)$ of a projected map object, and (ii) a null value (e.g., a zero value) if the (i,j)th pixel of the image data is a non-projection pixel.

In some cases, the techniques discussed herein include generating model input data for a machine learning model based on coordinate channels for a vehicle environment as determined based on the image data for the vehicle environment. In some cases, the model input data for the machine learning model include at least one of: (i) one or more images described by the image data, (ii) a horizontal coordinate channel determined by projecting map data to the image data, (iii) a vertical coordinate channel determined by projecting map data to the image data, or (iv) an object type channel.

In some cases, the object type channel associates pixels of a projection region with an object type of a map object that is projected into the projection region. An object type for a map object may represent one or more attributes of a roadway object that corresponds to the map object. For example, the object type for a map object may represent at least one of a type of the corresponding roadway object (e.g., representing whether the corresponding roadway object is a lane marking, a traffic light, a road sign, a crosswalk, a stop line, and/or the like) or a color intensity of the corresponding roadway object. In some cases, when the corresponding roadway object for a map object is a lane marking, the object type of the map object may represent a lane type (e.g., a bus lane type, a high-occupancy vehicle lane type, a premium lane type, etc.) for a street lane that is associated with the lane marking.

In some cases, if the image data for a vehicle environment includes one or more images each having the dimensions M×N, then the model input data for the vehicle environment includes a set of input channels (e.g., a set of red-green-blue (RGB) channels, a set of coordinate channels, an object type channel, etc.), where each input channel is a matrix with the dimensions M×N.

In some cases, the techniques discussed herein include providing the model input data to a machine learning model to generate one or more model outputs. The machine learning model may include one or more machine learning layers, such as one or more embedding layers, one or more convolutional neural network (CNN) layers, one or more fully connected layers, and/or one or more attention-based layers. In some cases, the machine learning model includes: (i) one or more CNN layers that are configured to process the model input data to generate a fixed-size representation of the model input data, and (ii) one or more fully connected layers that are configured to process the fixed-size representation to generate the model outputs.

The machine learning model may be trained using ground-truth data corresponding to the output structure of the machine learning model. For example, the ground-truth data used for training machine learning model may include depth maps generated based on lidar readings captured by a lidar sensor of the vehicle environment or annotated bounding box feature data for one or more annotated bounding boxes in the image data of the vehicle environment.

Once trained, the machine learning model may be configured to generate one or more model outputs for a vehicle environment based on model input data generated using the image data for the vehicle environment and map data for the vehicle environment. In some cases, the model outputs generated by the machine learning model include at least one of a depth map for image data of the vehicle environment or bounding box feature data for an object that is detected within the image data. The depth map for the image data may represent a predicted depth value for each pixel of the image data that represents a prediction about how far an image object depicted by the pixel is from one or more image sensors used to capture the image data. The bounding box feature data for a bounding box may represent at least one of the position of a roadway object associated with the bounding box within the image data (e.g., represented using predicted coordinates for corners of the bounding box in the image data), predicted coordinates for a centroid (e.g., the center of gravity) of the roadway object associated with the bounding box, and one or more predicted orientation measures (e.g., at least one of a predicted roll measure, a predicted pitch measure, or a predicted yaw measure) for the roadway object (e.g., vehicle) that is associated with the bounding box.

In some cases, the techniques discussed herein include controlling a vehicle based on model outputs generated by the machine learning model for the image data of the vehicle environment, such as based on at least one of a depth map of the image data of the vehicle environment or bounding box feature data for a bounding box that is detected in the image data. In some cases, the techniques discussed herein enable using map data of a vehicle environment to generate more reliable inferences from image data of the environment. The generated inferences can then be used as input data for a planning component of the autonomous vehicle environment to control the autonomous vehicle in a manner that is estimated to ensure safety and operational effectiveness of the autonomous vehicle.

For example, by projecting a map object that corresponds to a crosswalk into image data of a vehicle environment of a vehicle, the vehicle may generate model input data for a machine learning model that is configured to generate a depth map for the image data and bounding box feature data for an object that is detected within the image data. In this example, the bounding box feature data generated by the machine learning model may represent that the bounding box depicts a second vehicle in the environment. The bounding box feature data may also describe that the second vehicle depicted by the bounding box is predicted to have a particular orientation (e.g., at least one of a predicted roll measure, a predicted pitch measure, or a predicted yaw measure). The depth map generated by the machine learning model in the described example may represent how far the bounded region of the image data corresponding to the bounding box is from an image sensor of the autonomous vehicle that is used to capture the image data. Based on the described predictions about the position of the second vehicle within the image data, the depth of the second vehicle relative to the image sensor of the autonomous vehicle, and the orientation of the second vehicle, a planning component of the autonomous vehicle may predict a future trajectory for the second vehicle that represents a prediction about where the second vehicle will be in a future time. The predicted future trajectory of the depicted vehicle may then be used to determine a trajectory for controlling the autonomous vehicle and to provide commands to a system controller of the autonomous vehicle. The commands provided to the system controller may be configured to control the autonomous vehicle in accordance with the determined trajectory for the vehicle to avoid collision with the second vehicle.

In some cases, the techniques discussed herein include determining an estimated location of a vehicle in map data based on modifying an initial estimated location for the vehicle in the map data in accordance with a location offset for the vehicle. Once determined, the estimated location of the vehicle can be used to, for example, identify distances between the vehicle and map objects as part of projecting at least one of the map objects to a projection region in the image data associated with the vehicle environment. To determine the estimated location of the vehicle, a localization component of the vehicle may first receive or determine an initial estimated location of the vehicle, then determine a location offset for the vehicle, and then modify the initial estimated location of the vehicle based on the location offset to determine the estimated location of the vehicle. The initial estimated location may represent an initial estimation about the location of the vehicle, such as an initial estimation that is determined based on geographic coordinates reported by a GPS system associated with the vehicle.

The location offset may represent the expected inaccuracy of the initial estimated location of the vehicle. In some cases, the location offset for a vehicle may be determined based on historical data associated with the vehicle, such as historical data about how much initial estimated locations of the vehicle have in the past deviated from ground-truth locations when the vehicle was in the past predicted to be in the ground-truth locations. For example, in some cases, when an initial estimated location for a vehicle indicates that the vehicle is proximate to a home location and the vehicle is parked for a threshold period of time in that location, then a measure of deviation between the initial estimated location at that time and ground-truth map coordinates for the home location may be used to determine and/or update the location offset for the vehicle. In some cases, the location offset for a vehicle is determined based on an inaccuracy measure for a historical estimated location for the vehicle, and the inaccuracy measure is determined based on the historical estimated location and a ground-truth location for a time associated with the historical estimated location. This location offset may then be used in the future for adjusting the initial estimated locations of the vehicle to determine the estimated locations of the vehicle.

In some cases, the location offset for a vehicle may be determined based on an expected semantic segmentation and an observed semantic segmentation. The expected semantic segmentation may represent the expected position in the image data of a map object that is estimated to be within a field of view of a hypothetical vehicle that is assumed to be located at the initial estimated location. The observed semantic segmentation may represent the observed position in the image data of the map object as determined by performing semantic segmentation on the image data. For example, the expected semantic segmentation may represent an expected lane marking orientation for a map object that corresponds to a lane marking based on the relative location of the map object and the vehicle as described by the initial estimated location, while the observed semantic segmentation may represent an observed lane marking orientation for the map object as observed by performing semantic segmentation on the image data.

In some cases, the techniques discussed herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to collide with an object that is within the environment of the vehicle. Upon determining that the current trajectory is likely to collide with an object, the driver of the vehicle may be stopped from following the current trajectory and/or the driver of the vehicle may be alerted about the likelihood of collision. In some cases, upon determining that the current trajectory of an autonomous vehicle is likely to collide with an object in the autonomous vehicle environment, the driver of the autonomous vehicle may be alerted to exercise manual control of the autonomous vehicle.

In some cases, the techniques discussed herein can be implemented in a multi-sensor system, such as a multi-sensor system including image sensor(s) (e.g., RGB cameras), depth cameras (e.g., RGB D cameras (e.g., time-of-flight cameras)), lidar sensors, radar sensors, and/or sonar sensors, to provide redundancy to the system in the event of hardware or software failure. For example, in the event that a depth camera is occluded or broken, the techniques discussed herein can be used with an image sensor to provide redundancy and/or backup to ensure that dense depth information can be available under many circumstances. Thus, the techniques discussed herein provide additional improvements to computer vision systems, for example.

In some cases, the techniques described herein can be implemented to facilitate depth estimation in systems that do not have depth sensors and thus reduce resource requirements of computer vision systems that are configured to generate depth estimates. For example, in some cases, a machine learning model may be trained using ground-truth depth maps generated using lidar data. Once the trained, the machine learning model may be configured to predict depth maps in the absence of lidar data. Accordingly, the machine learning model may be configured to predict output data of a lidar sensor and eliminate the need for the lidar sensor. In some cases, a system without depth sensors does not need to receive or store sensor output data generated by such sensors. Accordingly, by eliminating the need for depth sensors in a system, the techniques described herein can reduce the network load of the system and/or the storage requirements of the system.

In some cases, the techniques described herein can be implemented to improve the accuracy of depth estimates generated by depth estimation systems, and thus improve accuracy and operational effectiveness of such systems. In some cases, due to limitations of depth sensors, depth maps generated by depth sensors (e.g., lidar sensors) may be sparse depth maps that have depth estimations for only a small number of observed regions in an environment. However, a machine learning model may be trained using these sparse depth maps as ground-truth data that, once trained, can generate dense depth maps having depth estimates for all of the observed regions in the environment. Accordingly, by using sparse depth maps generated by a depth sensor, a machine learning model that generates dense depth maps may be generated. In some cases, because dense depth maps provide a larger number of depth estimations for an environment than sparse depth maps, the techniques described herein can improve the accuracy of depth estimates generated by depth estimation systems via generating dense depth maps using a machine learning model that is trained using sparse depth maps.

The methods, apparatuses, and systems described herein can be implemented in a number of ways. Example implementations are provided below with reference to the following figures. Although discussed in the context of a vehicle, the methods, apparatuses, and systems described herein can be applied to a variety of systems using computer vision techniques, and are not limited to vehicles. Further, although described in connection with two-dimensional image data, the methods, apparatuses, and systems described herein are not limited to two-dimensional image data. In one example, the methods, apparatuses, and systems may be utilized to perform computer vision operations on three-dimensional image or on sensor data other than image data (e.g., lidar frames, radar frames, depth camera frames, etc.). Moreover, although various computer vision operations are described as being performed by a perception component of a vehicle computing device, a person of ordinary skill in the relevant technology will recognize that the perception component may be deployed on other computing devices, such as on a remote computing device that communicates with a vehicle computing device using a networked connection.

FIG. 1 illustrates an example architecture 100 for implementing the techniques for performing computer vision operations using image data 102 and map data 112 of a vehicle environment. For example, the architecture 100 may include a machine learning model 142 that is configured to receive, as model input data for the machine learning model 142, the image data 102, a first coordinate channel 122 generated by projecting the map data 112 into the image data 102, and a second coordinate channel 132 generated by projecting the map data 112 into the image data 102. As depicted in FIG. 1, the machine learning model 142 may be configured to process the model input to generate model output data including a depth map 152 and/or bounding box output data 162 that represents bounding box feature data for a bounding box 164 that is depicted in the image data 102.

The image data 102 can represent any type of image data captured using an image sensor. For example, the image data 102 can represent color intensity values associated with various locations within a region of the vehicle environment that is observed by the image sensor. The color intensity values may be associated with a color encoding scheme, such as the RGB scheme. Accordingly, in some cases, the image data 102 can represent RGB (red-green-blue) data captured by one or more image sensors installed on an autonomous vehicle. In some instances, the image data 102 can include any number of images at any frame rate.

In some cases, the image data 102 includes color intensity values (e.g., RGB values) for a set of pixels of the image. In some cases, the image data 102 may include a set of color intensity channels each including at least one M×N matrix having M×N color intensity values for M×N pixels of the image. For example, the image data 102 may include a red channel including a matrix that represents red color intensity values for pixels of the image data 102, a green channel including a matrix that represents green color intensity values for pixels of the image data 102, and a blue channel including a matrix that represents blue color intensity values for pixels of the image data 102. As another example, the image data 102 may include a single RGB channel that associates each pixel with a vector describing the three RGB values for the pixel.

A pixel may be a defined-size area within a region of the vehicle environment that is associated with a distinctive color intensity value as captured by the image sensor. The number of pixels of the image data 102 captured by an image sensor may depend on the resolution and/or the range of the image sensor. In some cases, a pixel is associated with a distinctive value in each of the input channels provided to the machine learning model 142. For example, a pixel may be associated with a distinctive red color intensity value in a red channel, a distinctive green color intensity value in a green channel, a distinctive blue color intensity value in a blue channel, a distinctive value in a horizontal coordinate channel, a distinctive value in a vertical coordinate channel, and/or a distinctive value in an object type channel.

In some cases, the image data 102 depicts a set of image objects 106 that are within the field of view of the image sensor of the vehicle 114, such as the image object 104 which corresponds to a vehicle and the image object 106 which corresponds to a lane marking. In some cases, some of the image objects depicted by the image data 102 may have corresponding map objects in the map data 112. For example, as depicted in FIG. 1, image object 106 is associated with a corresponding map object in the map data 112.

Map data 112 may represent one or more map objects. A map object may represent the location of a static environment feature (e.g., a lane marking, a traffic light, a road sign, a crosswalk, a stop line, and/or the like) as expressed in accordance with the coordinate system of the map data 112. In some cases, a map object corresponds to a roadway object type that includes one or more of a lane marking, a traffic light, a road sign, a crosswalk marking, or a stop line. Accordingly, map data 112 may represent relative locations of one or more static environment features. In some cases, at least a portion of the map data 112 is retrieved from a locally-stored map database. In some cases, at least a portion of the map data is received by querying a remotely-stored map database. In some cases, the map data 112 is generated by updating a locally-stored map database based on updates received from a remotely-stored map database. In some cases, the map object is associated with a first roadway object that is located on the ground and in between the vehicle and a second roadway object (e.g., a second roadway object whose position in the image data may be designated using the bounding box that is determined by the machine learning model 142).

In some cases, the map data 112 is associated with a first coordinate system (e.g., an x-y coordinate system) that is different from a second coordinate system (e.g., a u-v coordinate system) associated with the image data 102. This divergence between the coordinate systems of the image data 102 and the map data 112 may be because, unlike the map data 112, the image data 102 may be captured from a point of view of an image sensor of the vehicle and thus may associated with a different u-v coordinate system whose origin may be a location of the image sensor. In some cases, the x-y coordinate system of the map data 112 is a spherical or ellipsoidal coordinate system, such as the geographic coordinate system.

In some cases, model input data for the machine learning model 142 include a set of coordinate channels, such as the first coordinate channel 122 and the second coordinate channel 132. As depicted in FIG. 1, the first coordinate channel 122 and the second coordinate channel 132 are generated by projecting map points associated with the object 106 into a projection region of the image data 102. Exemplary techniques for projecting a point in the map data 112 to the image data 102 are described below with reference to FIG. 3.

In some cases, each map point associated with the object 106 is projected into a projection pixel of the image data 102, and then all of the projection pixels that are projected unto by map points associated with the object 106 form a projection region of the image data 102 for the object 106. In some cases, projecting the object 106 into the image data 102 includes determining or receiving an estimated location of the vehicle 114 in the map data 112, determining or receiving a location of the object 106 in the map data 112, determining location data 116 describing a distance between the estimated location of the vehicle 114 and the location of the object 106 in the map data 112, and projecting the object 106 into the image data 102 based on the location data 116 and the assumption that the vehicle 114 and/or the image sensor of the vehicle 114 is at the origin of coordinate system associated with the image data 102.

In some cases, more than one map object may be projected into the image data 102. In some cases, every map object whose respective roadway object is predicted to be observable from a field of view of the image sensor of the vehicle is projected into the image data 102. For example, in the example depicted in FIG. 1, in addition to the object 106, the crosswalk object may also in some cases be mapped into the image data 102. In some cases, after one or more map objects are projected to one or more respective projection regions in the image data 102, each pixel of the image data 102 is either a projection pixel (e.g., a pixel that is estimated to depict a map point in a map object that is projected into the image data 102) or a non-projection pixel (e.g., a pixel that is estimated to not depict a map point in a map object that is projected into the image data 102).

In some cases, after a map object point (e.g., a point in the map data 112 that is part of a map object that is projected into the image data 102) having map coordinates $(x_o, y_o)$ is projected into a projection pixel $(u_o, v_o)$ of the image data 102, the pixel is associated with the image coordinates $(u_o, v_o)$ and map coordinates $(x_o, y_o)$. In some cases, a coordinate channel represents, for a projection pixel, the map coordinates $(x_o, y_o)$ that are associated with the projection pixel. For example, a horizontal coordinate channel (such as the first coordinate channel 122) may represent x values for map coordinates associated with projection pixels in the image data 102. As another example, a vertical coordinate channel (such as the second coordinate channel 132) may represent y values for map coordinates associated with projection pixels in the image data 102.

As depicted in FIG. 1, the first coordinate channel 122 may represent, for a projection region that is projected onto by a map object, x map coordinates of the map object that is projected into the projection region. In some cases, when the two or more map objects are projected into two or more corresponding projection regions of the image data 102, then the first coordinate channel 122 may represent, for each projection region of the two or more projection regions, x map coordinates for the map object that is projected into the projection region. In some cases, the first coordinate channel 122 is an M×N matrix whose (i,j)th matrix value is: (i) $x_o$ if the (i,j)th pixel of the image data 102 is a projection pixel that is projected onto by a map object point $(x_o, y_o)$ of a projected map object, and (ii) a null value (e.g., a zero value) and/or a predefined value if the (i,j)th pixel of the image data is a non-projection pixel.

As further depicted in FIG. 1, the second coordinate channel 132 may represent, for a projection region that is projected unto by a map object, y map coordinates of the map object that is projected into the projection region. In some cases, when the two or more map objects are projected into two or more corresponding projection regions of the image data 102, then the second coordinate channel 132 may represent, for each projection region of the two or more projection regions, y map coordinates for the map object that is projected into the projection region. In some cases, the second coordinate channel 132 is an M×N matrix whose (i,j)th matrix value is: (i) $y_o$ if the (i,j)th pixel of the image data 102 is a projection pixel that is projected onto by a map object point $(x_o, y_o)$ of a projected map object, and (ii) a null value (e.g., a zero value) and/or a predefined value if the (i,j)th pixel of the image data is a non-projection pixel.

Accordingly, in some cases, if a pixel having image coordinates $(u_p, v_p)$ is a projection pixel (e.g., if the pixel is projected unto by a map object point in the map data 112 and is thus part of the projection region for a map object that is projected into the image data 102), then the first coordinate channel 122 may depict the x value of the map object point that is projected into the projection pixel as a matrix value having the index $(u_p, v_p)$. However, if a pixel having image coordinates $(u_p, v_p)$ is not a projection pixel (e.g., if the pixel is not projected onto by a map object point in the map data 112 and is thus not part of the projection region for a map object that is projected into the image data 102), then the first coordinate channel 122 may depict a null value and/or a predefined value as a matrix value having the index $(u_p, v_p)$. Similarly, in some cases, if a pixel having image coordinates $(u_p, v_p)$ is a projection pixel, then the second coordinate channel 132 may depict the y value of the map object point that is projected into the projection pixel as a matrix value having the index $(u_p, v_p)$. However, if a pixel having image coordinates $(u_p, v_p)$ is not a projection pixel, then the second coordinate channel 132 may depict a null value and/or a predefined value as a matrix value having the index $(u_p, v_p)$.

As depicted in FIG. 1, the machine learning model 142 is configured to process the model input data including the image data 102 (e.g., provided as a set of color intensity channels, such as a red channel, a blue channel, and a green channel) and one or more coordinate channels (e.g., the first coordinate channel 122 and the second coordinate channel 132) to generate model output data including a depth map 152 of the vehicle environment and bounding box output data 162 that represents bounding box feature data for a bounding box 164 that is depicted in the image data 102. The machine learning model 142 may include a clustering model, a classification model, and/or a regression model. In some examples, the machine learning model 142 may include a neural network. In some cases, an exemplary neural network passes input data through a series of connected layers to produce an output. Each layer in a neural network can also include another neural network, or can include any number of layers (whether convolutional or not). As can be understood in the context of this disclosure, a neural network can utilize machine learning techniques, which can refer to a broad class of such algorithms in which an output is generated based on learned parameters.

Any type of machine learning algorithm can be used as at least a part of operations of the machine learning model 142 consistent with this disclosure. For example, machine learning algorithms that can be utilized by the machine learning model 142 include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression trec (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like.

In some cases, the machine learning model 142 may be trained using ground-truth data corresponding to the output structure of the machine learning model. For example, the ground-truth data used for training machine learning model may include depth maps generated based on lidar readings captured by a lidar sensor of the vehicle environment (and/or densified depth data such that every pixel of training data has an associated depth value) and/or annotated bounding box feature data for one or more annotated bounding boxes in the image data of the vehicle environment. In some cases, at least a portion of the ground-truth data for a training data entry that is associated with corresponding image data is determined based on depth sensor output data captured by a depth sensor concurrently with capturing of the corresponding image data by an image sensor. In some cases, at least a portion of the ground-truth data for a training data entry that is associated with corresponding image data is determined by determining or receiving an annotated (e.g., manually-annotated) bounding box in the corresponding image data and/or determining or receiving annotated (e.g., manually-annotated) bounding box feature data for the annotated bounding box. In some cases, annotated bounding box feature data for an annotated bounding box include at least one of annotated image coordinates for at least one corner (e.g., all eight corners) of the annotated bounding box, annotated image coordinates for a centroid (e.g., a center of gravity) of the bounding box, or at least one annotated orientation measure (e.g., at least one of an annotated roll measure, an annotated pitch measure, or an annotated yaw measure) for the bounding box.

In some cases, the machine learning model 142 is trained using a loss function that is determined based on a measure of deviation between: (i) the ground-truth depth map for a training data entry, and (ii) a predicted depth map that is generated during the training by processing the corresponding image data for the training data entry using the machine learning model 142. In some cases, the machine learning model 142 is trained using a loss function that is determined based on a measure of deviation between: (i) the annotated bounding box feature data for an annotated bounding box in a training data entry, and (ii) bounding box feature data for a bounding box that is generated during training by processing the corresponding image data entry for the training data entry using the machine learning model 142. In some cases, the machine learning model 142 is trained using a hybrid loss function that is determined by combining a set of loss functions, such as the two loss functions described above. Exemplary techniques for training the machine learning model 142 are described with reference to FIG. 6 described below.

In some cases, training the machine learning model 142 using a loss function includes determining parameters for the machine learning model 142 that minimize (e.g., globally minimize, locally minimize, and/or the like) the loss function. This loss function minimization may be performed using an optimization algorithm, such as using a gradient-descent-based algorithm (e.g., using an algorithm that uses gradient descent with backpropagation).

Once trained, the machine learning model 142 may be configured to generate one or more model outputs, such as a depth map 152 and bounding box output data 162. The depth map 152 may represent, for a pixel of the image data 102, an estimated depth value that represents an estimated distance between an image sensor used to capture the image data 102 and an environment feature (e.g., a vehicle, a roadway marking, a traffic line, a wall, a pedestrian, and the like) that is depicted by the pixel. In some cases, the depth map 152 may represent, for each pixel of the image data 102, an estimated depth value for the pixel. In some cases, the depth map 152 is an M×N matrix (e.g., having the same dimensions as the image data 102 and/or the input channels) that associates each matrix value having the index $(u_p, v_p)$ to an estimated depth value for the pixel having the image coordinates $(u_p, v_p)$ in the image data 102.

The bounding box output data 162 may represent bounding box feature data for a bounding box detected within the image data 102. For example, as depicted in FIG. 1, the bounding box output data 162 represents image coordinates for eight corners of a bounding box 164 that contains the object 104. A bounding box may describe a region of the image data 102 that is predicted to depict an image object of interest, such as a vehicle, a traffic light, a traffic sign, and the like. In some cases, bounding box feature may describe a prediction about an attribute of a bounding box and/or an attribute of an object depicted by the bounding box, such as at least one of the image coordinates for at least one corner of the bounding box, a centroid location of the bounding box (e.g., a centroid location of the object that is predicted to be contained within the bounding box), a predicted yaw measure for the bounding box, a type of the object (e.g., a roadway object type) that is predicted to be contained within the bounding box, or the like. In some cases, the bounding box output data 162 may represent bounding box feature data for two or more bounding boxes.

Figure 2:
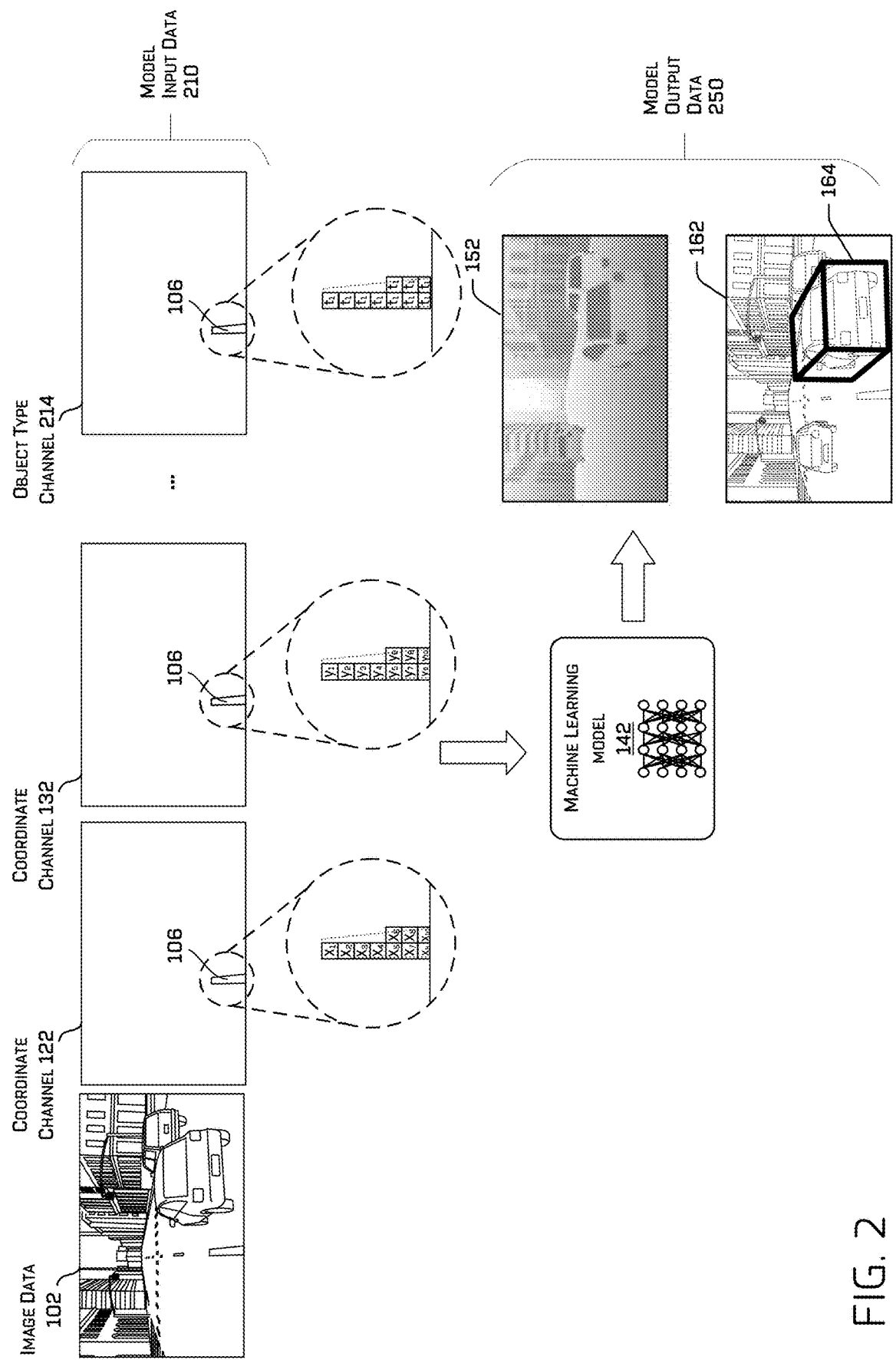
FIG. 2 provides an operational example of an inference of a machine learning model that is configured to perform computer vision operations by processing model input data generated using projection of a map object into corresponding image data.

Accordingly, the machine learning model 142 may be configured to determine at least one of a depth map 152 for image data 102 of a vehicle environment or bounding box output data 162 representing bounding box feature data for a bounding box 164 detected within the image data 102. An example inference that may be performed by the machine learning model 142 is depicted in FIG. 2. As depicted in FIG. 2, the model input data 210 for the machine learning model 142 includes image data 102 of a vehicle environment, a first coordinate channel 122, a second coordinate channel 132, and an object type channel 214.

In some cases, the object type channel 214 associates pixels of a projection region with an object type of a map object that is projected into the projection region. An object type for a map object may represent one or more attributes of a roadway object that corresponds to the map object. For example, the object type for a map object may represent at least one of a type of the corresponding roadway object (e.g., representing whether the corresponding roadway object is a lane marking, a crosswalk, a stop line, etc.) or a color intensity of the corresponding roadway object. In some cases, when corresponding roadway object for a map object is a lane marking, the object type of the map object may represent a lane type (e.g., a bus lane type, a high-occupancy vehicle lane type, a premium lane type, etc.) for a street lane that is associated with the lane marking.

In some cases, the object type channel 214 includes an M×N matrix. In some cases, if an (i,j)th pixel of the image data 102 is a projection pixel in a projection region, then the matrix value in the M×N matrix that has an index of (i,j) represents an object type of the map object that is projected into the projection region. For example, if the (i,j)th pixel of the image data 102 is a projection pixel in a projection region associated with a lane marking, then the matrix value in the M×N matrix that has the index of (i,j) may represent that the corresponding pixel is predicted to depict a lane marking map object. In some cases, if an (i,j)th pixel of the image data 102 is not a projection pixel, then the matrix value in the M×N matrix that has an index of (i,j) represents a null and/or predefined value, such as a value of zero.

As further depicted in FIG. 2, the machine learning model 142 processes the model input data 210 to generate model output data 250. The model output data 250 may include a depth map of the vehicle environment and/or bounding box output data 162 representing bounding box feature data for a bounding box 164 detected within the image data 102 of the vehicle environment.

Figure 3:
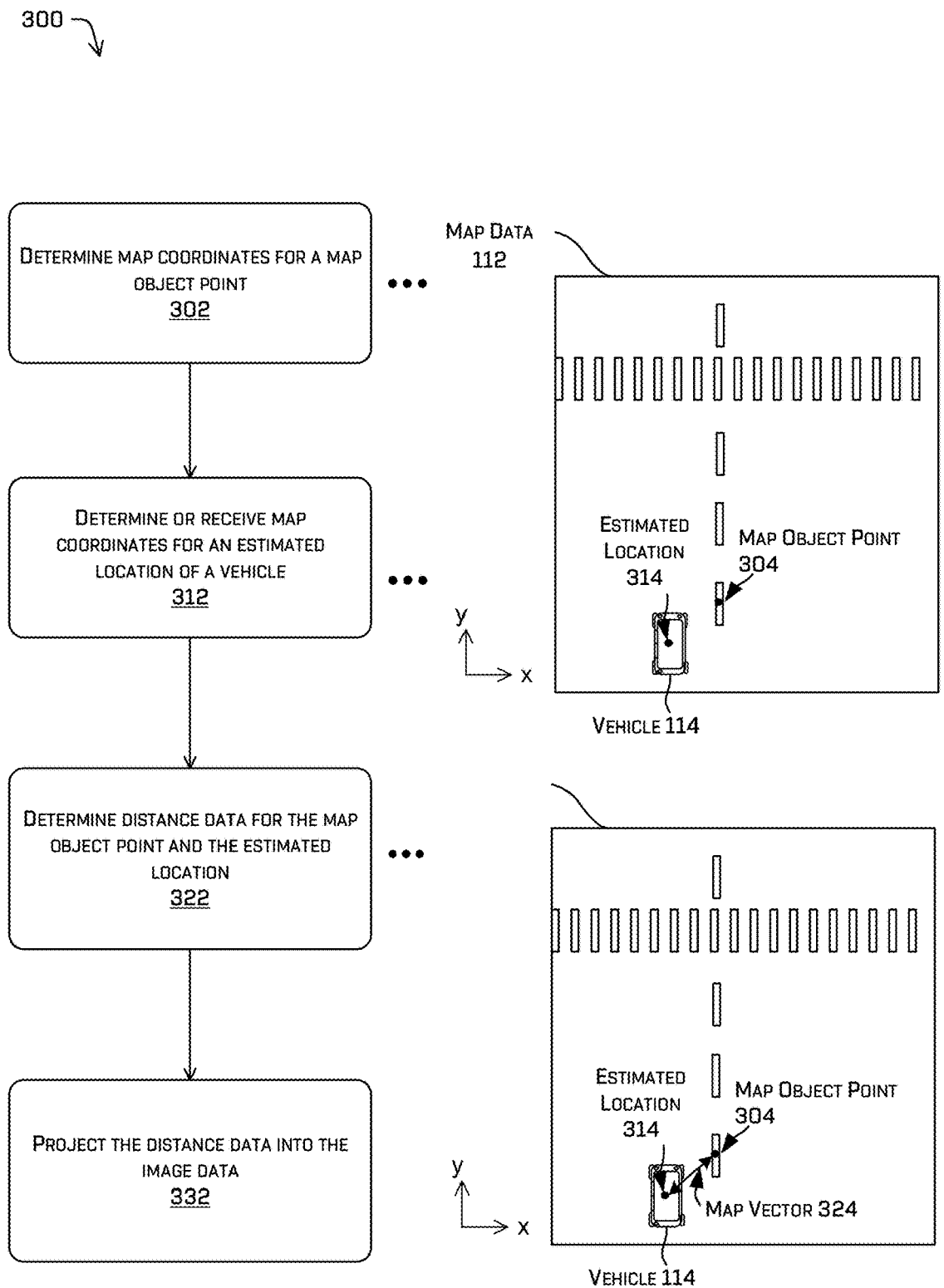
FIG. 3 is a pictorial flow diagram of an example process for projecting a map object point in map data into a pixel of image data.

FIG. 3 is a pictorial flow diagram of an example process 300 for projecting a map object point 304 in the map data 112 into a pixel of the image data 102. As depicted in FIG. 3, at operation 302, the process 300 includes determining map coordinates for the map object point 304. The map object point 304 may be a point in the map data 112 that is part of a map object that is selected for projection into the image data 102. For example, as depicted in the exemplary projection depicted in FIG. 3, the map object point 304 is part of a map object corresponding to a lane marking. In some cases, a map object may be selected for projection into the image data 102 if the map object is determined to be within a field of view of an estimated location of a vehicle 114 and/or an estimated image sensor location for an image sensor of the vehicle 114.

At operation 312, the process 300 includes determining or receiving an estimated location 314 of the vehicle 114 in the map data 112. The estimated location may be a point in the map data 112 that the vehicle 114 is estimated to be in. In some cases, the estimated location 314 may be received from a GPS component of the vehicle 114 and/or from a remote GPS device (e.g., a remote GPS satellite device and/or a remote GPS server system). In some cases, the estimated location 314 may be determined based on an initial estimated location of the vehicle 114, such as an initial estimated location of the vehicle 114 that is determined based on reported GPS coordinates of the vehicle 114. In some cases, the estimated location 314 may be determined by adjusting the initial estimated location of the vehicle 114 using a location offset. Exemplary techniques for determining the estimated location of the vehicle 114 are described below with reference to FIG. 4.

At operation 322, the process 300 includes determining distance data for the map object point 304 and the estimated location 314 of the vehicle. As depicted in FIG. 3, in some cases, the distance data represents vector coordinates associated with a map vector 324 between the map object point 304 and the estimated location 314. The map vector 324 may be a vector in the map data 112 that spans from the estimated location 314 to the map object point 304. In some cases, determining the distance data for the map object point 304 and the estimated location 314 includes determining the map vector 324 in the map data 112 between the map object point 304 and the estimated location 314, determining vector coordinates (e.g., Cartesian coordinates, polar coordinates, and the like) for the map vector 324 in accordance with a coordinate system of the map data 112, and determining the distance data for the map object point 304 and the estimated location 314 based on the vector coordinates.

At operation 332, the process 300 includes projecting the distance data associated with the map object point 304 into the image data 102. In some cases, the distance and/or vector coordinates associated with the map object (e.g., as represented by the distance data) is projected into the image data 102 based on a pose of the image sensor of the vehicle 114 (e.g., based on the direction at which the image sensor is pointed). In some cases, the map object point 304 is mapped to a pixel that is the endpoint of an image vector. In some cases, the image vector is a vector having the magnitude and direction of the map vector 324 which spans in the image data from the origin of the coordinate system of the image data. In some cases, the magnitude of the image vector is determined by scaling the map vector 324 based on a scaling ratio for the image data 102 and the map data 112.

Figure 4:
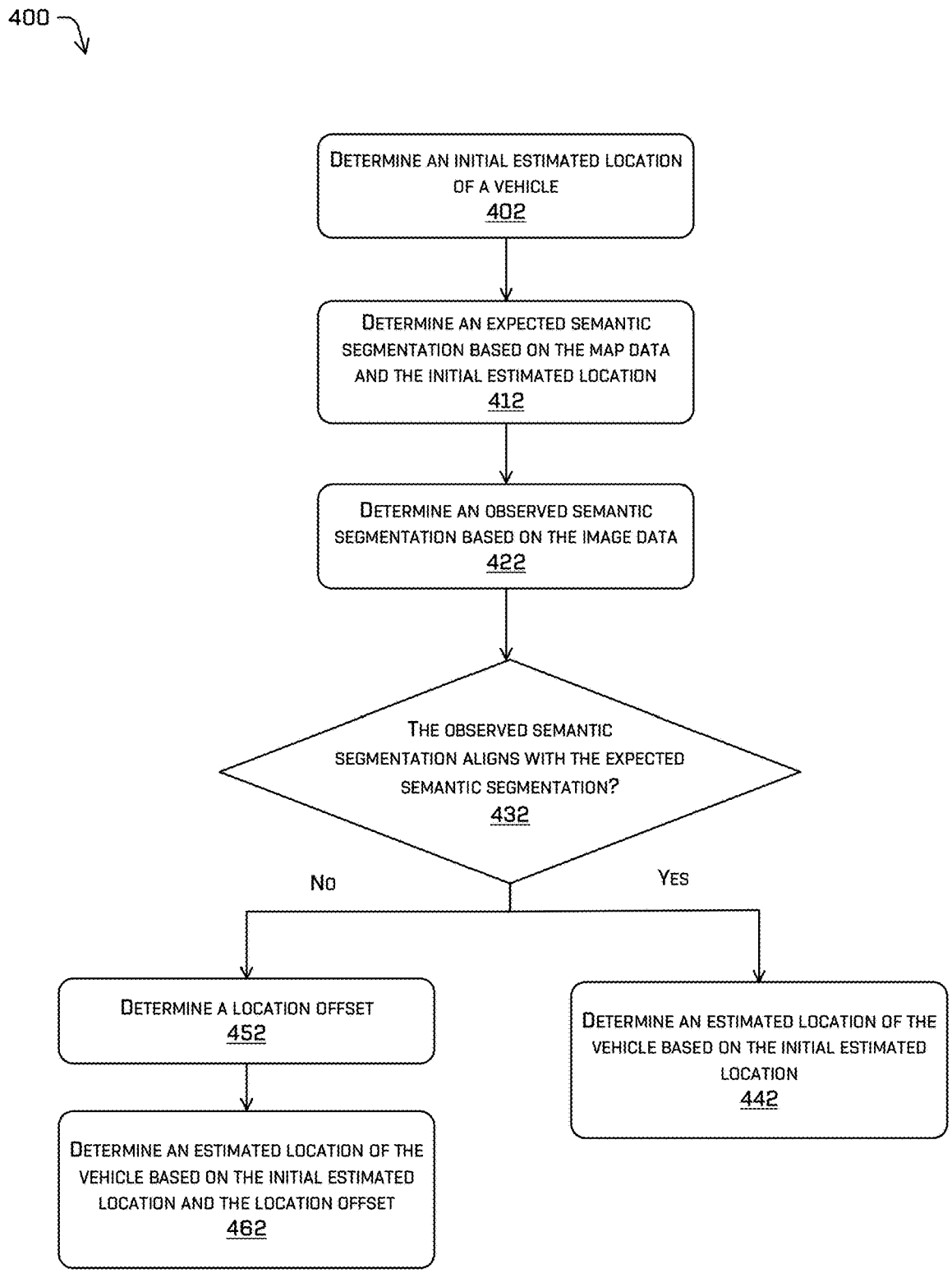
FIG. 4 depicts an example process for determining an estimated location of a vehicle in map data.

FIG. 4 depicts an example process 400 for determining an estimated location of a vehicle in the map data. As depicted in FIG. 4, at operation 402, the process 400 includes determining an initial estimated location of the vehicle. The initial estimated location may represent an initial estimation about the location of the vehicle, such as an initial estimation that is determined based on geographic coordinates reported by a GPS system (or other localization system) associated with the vehicle. In some cases, the estimated location may be received from a GPS component of the and/or from a remote GPS device, for example by querying an application programming interface (API) of a GPS server that reports GPS coordinates associated with the vehicle.

At operation 412, the process 400 includes determining an expected semantic segmentation based on the map data and the initial estimated location. The expected semantic segmentation may represent the expected position in the image data of a map object that is estimated to be within a field of view of a hypothetical vehicle that is assumed to be located at the initial estimated location. Accordingly, in some cases, the expected semantic segmentation may describe how image data captured by the image sensor of the vehicle is expected to depict a map object if the vehicle was at exactly the initial estimated location. For example, the expected semantic segmentation may describe an expected orientation of a lane marking if the vehicle was at exactly the initial estimated location. The expected semantic segmentation may be determined based on map data. In some cases, the expected semantic segmentation may be determined based on what portions of map objects are predicted to be within the field of view of a hypothetical vehicle that is assumed to be at the initial estimated location, as determined based on the map data. In some cases, the expected semantic segmentation may be determined based on where (e.g., to the right of, to the left of, in front of, and the like) a map object is predicted to be within the field of view of a hypothetical vehicle that is assumed to be at the initial estimated location.

At operation 422, the process 400 includes determining an observed semantic segmentation based on the image data. The observed semantic segmentation may represent the observed position in the image data of the map object as determined by performing semantic segmentation on the image data. Accordingly, in some cases, the observed semantic segmentation may describe how the image data captured by the image sensor of the vehicle actually depicts a map object after the image data is processed using semantic segmentation operations. For example, the observed semantic segmentation may describe an observed orientation of a lane marking in image data of the vehicle environment as determined by performing semantic segmentation operations on the image data.

At operation 432, the process 400 includes determining whether the expected semantic segmentation and the observed semantic segmentation align. In some cases, if the position and/or orientation of a map object (e.g., a lane marking) as represented by the expected semantic segmentation differs from the position and/or orientation of the map object as represented by the observed semantic segmentation, then the expected semantic segmentation and the observed semantic segmentation are not in alignment. In some cases, if the positions and/or orientations of all map objects depicted by the expected semantic segmentation and the observed semantic segmentation are the same in both semantic segmentations, then the expected semantic segmentation and the observed semantic segmentation are in alignment.

At operation 442, the process 400 includes determining the estimated location of the vehicle based on the initial estimated location if the observed semantic segmentation aligns with the expected semantic segmentation. In some cases, if the observed semantic segmentation aligns with the expected semantic segmentation, the initial estimated location is adopted as the estimated location of the vehicle.

At operation 452, the process 400 includes determining a location offset for the vehicle if the observed semantic segmentation does not align with the expected semantic segmentation. In some cases, the location offset represents the expected inaccuracy of the initial estimated location of the vehicle.

In some cases, the location offset for a vehicle may be determined based on historical data associated with the vehicle, such as historical data about how much initial estimated locations of the vehicle have in the past deviated from ground-truth locations when the vehicle was in the past predicted to be in the ground-truth locations. For example, in some cases, when an initial estimated location for a vehicle indicates that the vehicle is proximate to a home location and the vehicle is parked for a threshold period of time in that location, then a measure of deviation between the initial estimated location at that time and ground-truth map coordinates for the home location may be used to determine and/or update the location offset for the vehicle.

In some cases, the location offset for a vehicle may be determined based on the expected semantic segmentation and the observed semantic segmentation. In some cases, the location offset may be determined based on a measure of deviation of the expected semantic segmentation and the observed semantic segmentation. In some cases, the measure of deviation between the two semantic segmentations may be determined by performing convex optimization operations to detect a minimal number of shifts and/or modifications needed to align the expected semantic segmentation to the observed semantic segmentation.

At operation 462, the process 400 includes determining the estimated location for the vehicle based on the initial estimated location and the location offset if the observed semantic segmentation does not align with the expected semantic segmentation. In some cases, if the observed semantic segmentation does not align with the expected semantic segmentation, the initial estimated location is adjusted based on the location offset to determine the estimated location of the vehicle.

Figure 5:
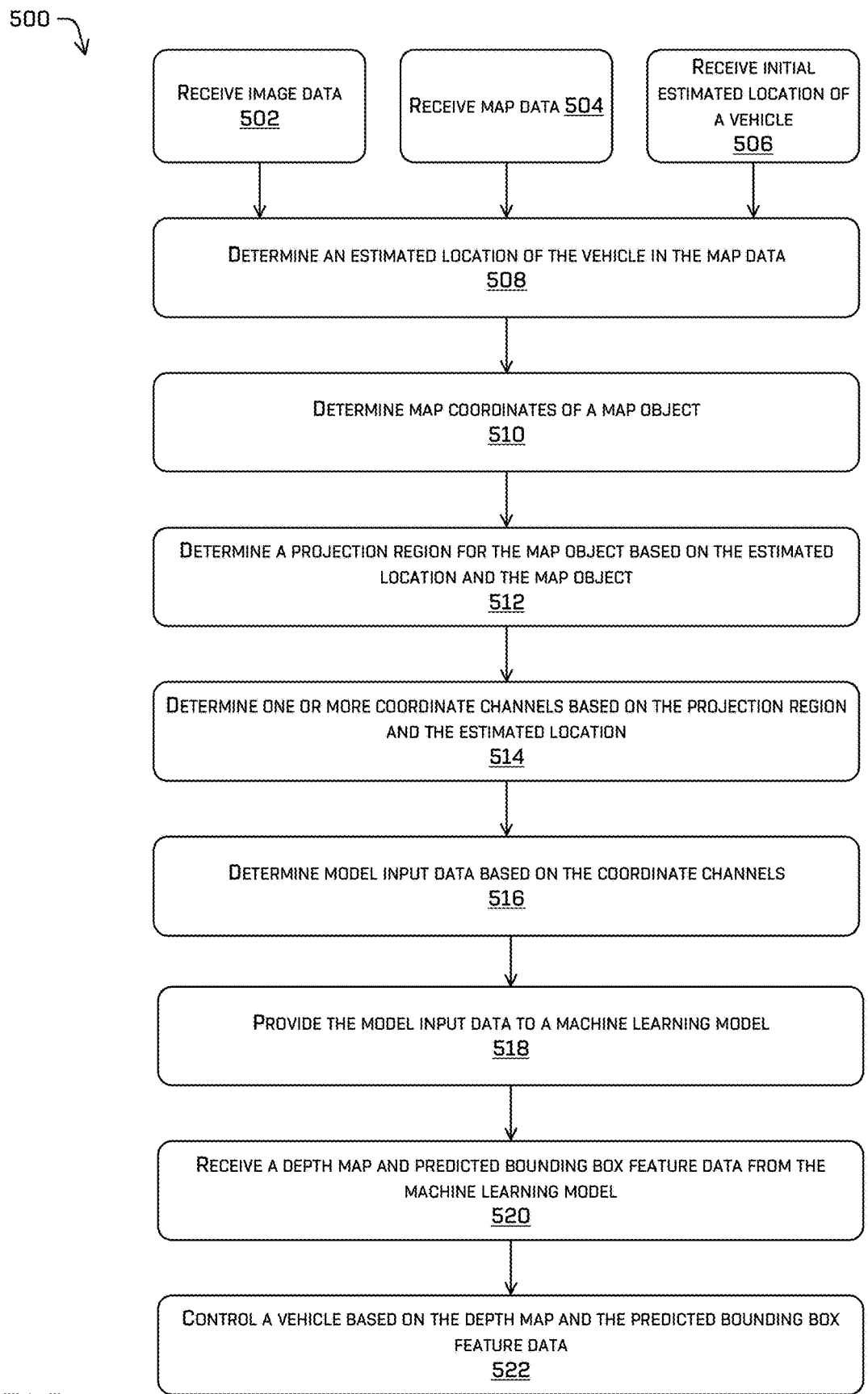
FIG. 5 depicts an example process for controlling a vehicle using projection of a map object in map data of a vehicle environment to a projection region of image data associated with the vehicle environment.

FIG. 5 depicts an example process 500 for controlling a vehicle (e.g., an autonomous vehicle) using projection of a map object in map data the vehicle environment to a projection region of image data associated with the vehicle environment. As depicted in FIG. 5, the process 500 includes receiving the image data at operation 502 and receiving the map data at operation 504. The image data for the vehicle environment may be captured by one or more image sensors (e.g., a visible light spectrum camera, a depth camera, an infrared camera, etc.) of the vehicle. The image data may include one or more images, such as a multi-channel image. The map data may be generated by receiving or determining an estimated location of the vehicle within the map data and detecting one or more map objects described in the map data that are estimated to be within a line of sight of the estimated vehicle location.

At operation 506, the process 500 includes receiving an initial estimated location of the vehicle in the map data. The initial estimated location may represent an initial estimation about the location of the vehicle, such as an initial estimation that is determined based on geographic coordinates reported by a GPS system (or other localization system) associated with the vehicle.

At operation 508, the process 500 includes determining an estimated location of the vehicle in the map data based on the initial estimated location. In some cases, the initial estimated location is adopted as the estimated location of the vehicle. In some cases, the initial estimated location is adjusted based on a location offset for the vehicle to determine the estimated location of the vehicle. In some cases, the location offset for a vehicle may be determined based on historical data associated with the vehicle, such as historical data about how much initial estimated locations of the vehicle have in the past deviated from ground-truth locations when the vehicle was in the past predicted to be in the ground-truth locations. In some cases, the location offset for a vehicle may be determined based on an expected semantic segmentation and an observed semantic segmentation. The expected semantic segmentation may represent the expected position in the image data of a map object that is estimated to be within a field of view of a hypothetical vehicle that is assumed to be located at the initial estimated location. The observed semantic segmentation may represent the observed position in the image data of the map object as determined by performing semantic segmentation on the image data.

At operation 510, the process 500 includes determining map coordinates of a map object. A map object may represent the location of a static environment feature (e.g., a lane marking, a crosswalk, a stop line, and/or the like) in the map data and as expressed in accordance with the coordinate system of the map data. In some cases, a map object corresponds to a roadway object type that includes one or more of a lane marking, a crosswalk marking, or a stop line. In some cases, the map data is associated with a first coordinate system (e.g., an x-y coordinate system) that is different from a second coordinate system (e.g., a u-v coordinate system) associated with the image data.

At operation 512, the process 500 includes determining a projection region for the map object in the image data based on the estimated location of the vehicle in the map and the map object. In some cases, a map object point in the map data is mapped to a projection pixel of the image data based on distance data for the map object point and the estimated location of the vehicle. In some cases, the distance data represents vector coordinates associated with a map vector between the map object point and the estimated location of vehicle in the map data. In some cases, all of the projection pixels that are projected unto by map object points associated with the map object form the projection region of the image data for the map object.

At operation 514, the process 500 includes determining one or more coordinate channels based on the projection region and the coordinates for the estimated location of the vehicle in the map data. In some cases, after a map object point having map coordinates $(x_o, y_o)$ is projected into a projection pixel $(u_o, v_o)$ of the image data, the pixel is associated with the image coordinates $(u_o, v_o)$ and map coordinates $(x_o, y_o)$. In some cases, a coordinate channel represents, for a projection pixel, the map coordinates $(x_o, y_o)$ that are associated with the projection pixel. For example, a horizontal coordinate channel may represent x values for map coordinates associated with projection pixels in the image data. As another example, a vertical coordinate channel may represent y values for map coordinates associated with projection pixels in the image data 102.

At operation 516, the process 500 includes determining model input data for a machine learning model based on the coordinate channels. In some cases, the model input data for the machine learning model include at least one of: one or more images described by the image data, at least one coordinate channel, or an object type channel. In some cases, the image data may include a set of color intensity channels each including at least one M×N matrix having M×N color intensity values for M×N pixels of the image. For example, the image data may include a red channel including a matrix that represents red color intensity values for pixels of the image data, a green channel including a matrix that represents green color intensity values for pixels of the image data, and a blue channel including a matrix that represents blue color intensity values for pixels of the image data. As another example, the image data may include a single RGB channel that associates each pixel with a vector describing the three RGB values for the pixel. In some cases, the coordinate channels included in the model input may include at least one of: (i) a first coordinate channel that represents, for the projection region that is projected unto by the map object, x map coordinates of the map object that is projected into the projection region, or (ii) a second coordinate channel that represents, for the projection region that is projected unto by the map object, y map coordinates of the map object that is projected into the projection region. In some cases, the object type channel associates pixels of the projection region with an object type of the map object that is projected onto the projection region.

At operation 518, the process 500 includes providing the model input data to the machine learning model. In some cases, the model input data is provided as a set of input channels of the same dimension.

At operation 520, the process 500 includes receiving, from the machine learning model and as model output data, a depth map for the image data and bounding box feature data for a bounding box that is detected in the image data. The depth map may represent an estimated depth value for each pixel of the image data. The bounding box feature data for a bounding box may represent at least one of the position of a roadway object associated with the bounding box within the image data (e.g., using predicted coordinates for corners of the bounding box in the image data), predicted coordinates for a centroid of the roadway object associated with the bounding box, and one or more predicted orientation measures (e.g., at least one of a predicted roll measure, a predicted pitch measure, or a predicted yaw measure) for the roadway object (e.g., vehicle) that is associated with the bounding box.

At operation 522, the process 500 includes controlling the autonomous vehicle based on the model output data. In some cases, the bounding box feature data generated by the machine learning model may represent that a bounding box in the image data depicts a vehicle in the environment. The bounding box feature data may also describe that the vehicle depicted by the bounding box is predicted to have a particular orientation (e.g., at least one of a predicted roll measure, a predicted pitch measure, or a predicted yaw measure). The depth map generated by the machine learning model in the described example may represent how far the bounded region of the image data corresponding to the bounding box is from an image sensor of the vehicle that is used to capture the image data. Based on the described predictions about the position of the second vehicle within the image data, the depth of the second vehicle relative to the image sensor of the autonomous vehicle, and the orientation of the second vehicle, the vehicle may predict a future trajectory for the depicted vehicle that represents a prediction about where the second vehicle will be in a future time. The predicted future trajectory of the second vehicle may then be used to determine a trajectory for controlling the vehicle and to provide commands to a system controller of the autonomous vehicle to control the vehicle in accordance with the determined trajectory for the vehicle (e.g., to avoid collision with the second vehicle).

Figure 6:
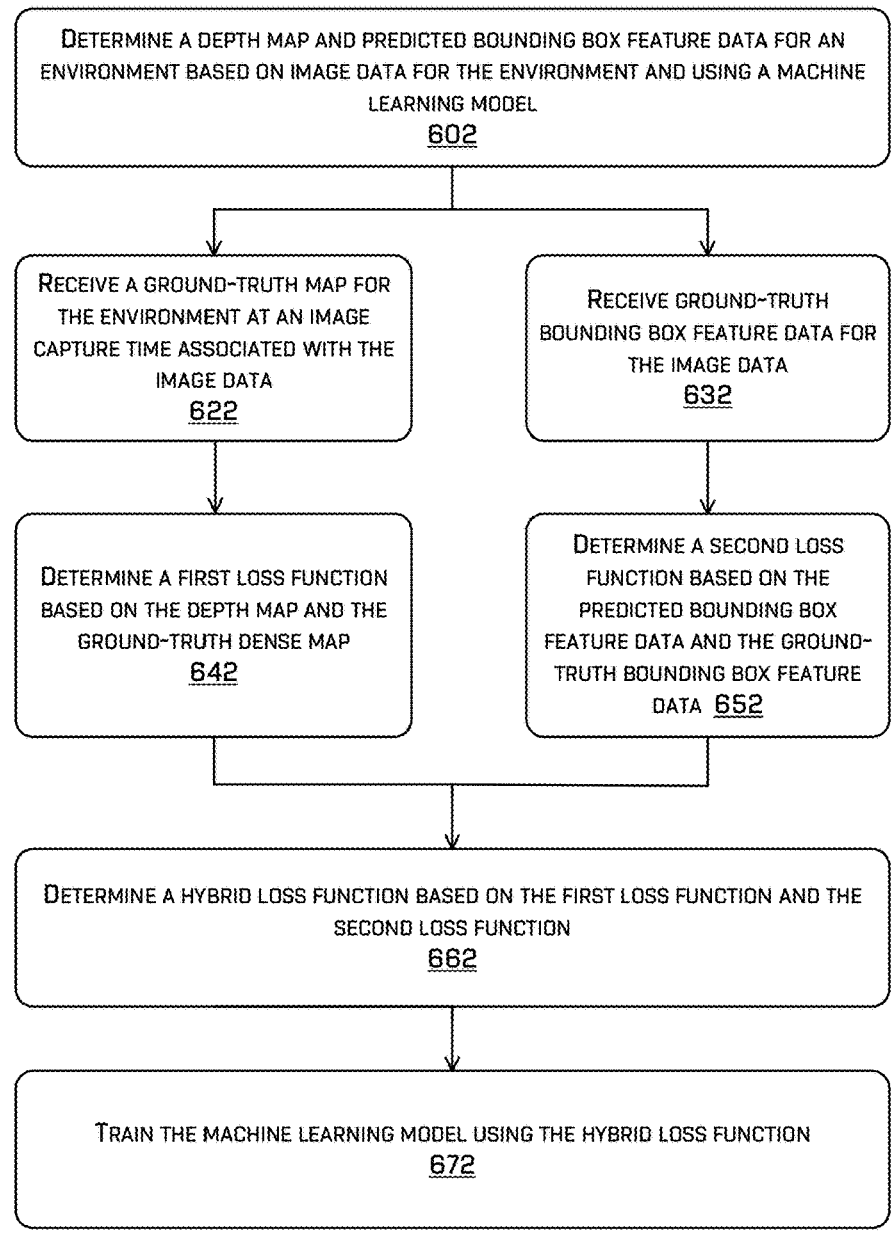
FIG. 6 depicts an example process for training a machine learning model configured to generate a depth map and bounding box feature data for image data of a vehicle environment.

FIG. 6 provides an example process 600 for training a machine learning model configured to generate a depth map and bounding box feature data for image data of a vehicle environment. At operation 602, the process 600 includes determining the depth map and the bounding box feature data for the vehicle environment based on the image data and using the machine learning model. In some cases, a set of input channels determined based on the image data and map data for the vehicle environment are provided as model input data to the machine learning model, and the machine learning model is configured to process the model input data to generate model output data including the depth map and the bounding box feature data for the vehicle environment.

At operation 622, the process 600 includes determining a ground-truth dense depth map for the vehicle environment at an image capture time associated with capturing of the image data by an image sensor of the vehicle. In some cases, the ground-truth depth map may be determined based on the sensor output data for a depth sensor (e.g., a lidar sensor) and in relation to the image capture time. In some cases, due to limitations of depth sensors, depth maps generated by depth sensors (e.g., lidar sensors) may be sparse depth maps that have depth estimations for only a small number of observed regions in the vehicle environment. However, a machine learning model may be trained using depth data generated by depth sensors as ground-truth data. In some cases, once trained, this machine learning model can generate dense depth maps that have depth estimations for all of the observed regions in the vehicle environment.

At operation 632, the process 600 includes determining ground-truth bounding box feature data for the image data. In some cases, the ground-truth bounding box feature data represent an annotated (e.g., manually-annotated) bounding box in the image data and/or other annotated (e.g., manually-annotated) bounding box feature data for the annotated bounding box. In some cases, annotated bounding box feature data for an annotated bounding box include at least one of annotated image coordinates for at least one corner (e.g., all eight corners) of the annotated bounding box, annotated image coordinates for a centroid (e.g., a center of gravity) of the object associated with the bounding box, or at least one annotated orientation measure (e.g., at least one of an annotated roll measure, an annotated pitch measure, or an annotated yaw measure) for the object associated with annotated bounding box.

At operation 642, the process 600 includes determining a first loss function based on the depth map generated by the machine learning model and the ground-truth depth map. In some cases, the first loss function represents a measure of deviation between the depth map generated by the machine learning model and the ground-truth depth map.

At operation 652, the process 600 includes determining a second loss function based on the bounding box feature data generated by the machine learning model and the bounding box feature data. In some cases, the second loss function represents a measure of deviation between the bounding box feature data generated by the machine learning model and the ground-truth bounding box feature data.

At operation 662, the process 600 includes determining a hybrid loss function based on the first loss function and the second loss function. The hybrid loss function may be generated by combining the two loss functions. For example, the hybrid loss function may represent the output of arithmetic addition of the two loss functions. As another example, the hybrid loss function may represent the output of an averaging of the two loss functions. As yet another example, the hybrid loss function may represent the output of a weighted averaging of the two loss functions.

At operation 672, the process 600 includes training the machine learning model using the hybrid loss function. In some cases, training the machine learning model using the hybrid loss function includes determining parameters for the machine learning model that minimize (e.g., globally minimize, locally minimize, and/or the like) the hybrid loss function. This loss function minimization may be performed using an optimization algorithm, such as using a gradient-descent-based algorithm (e.g., using an algorithm that uses gradient descent with backpropagation).

Figure 7:
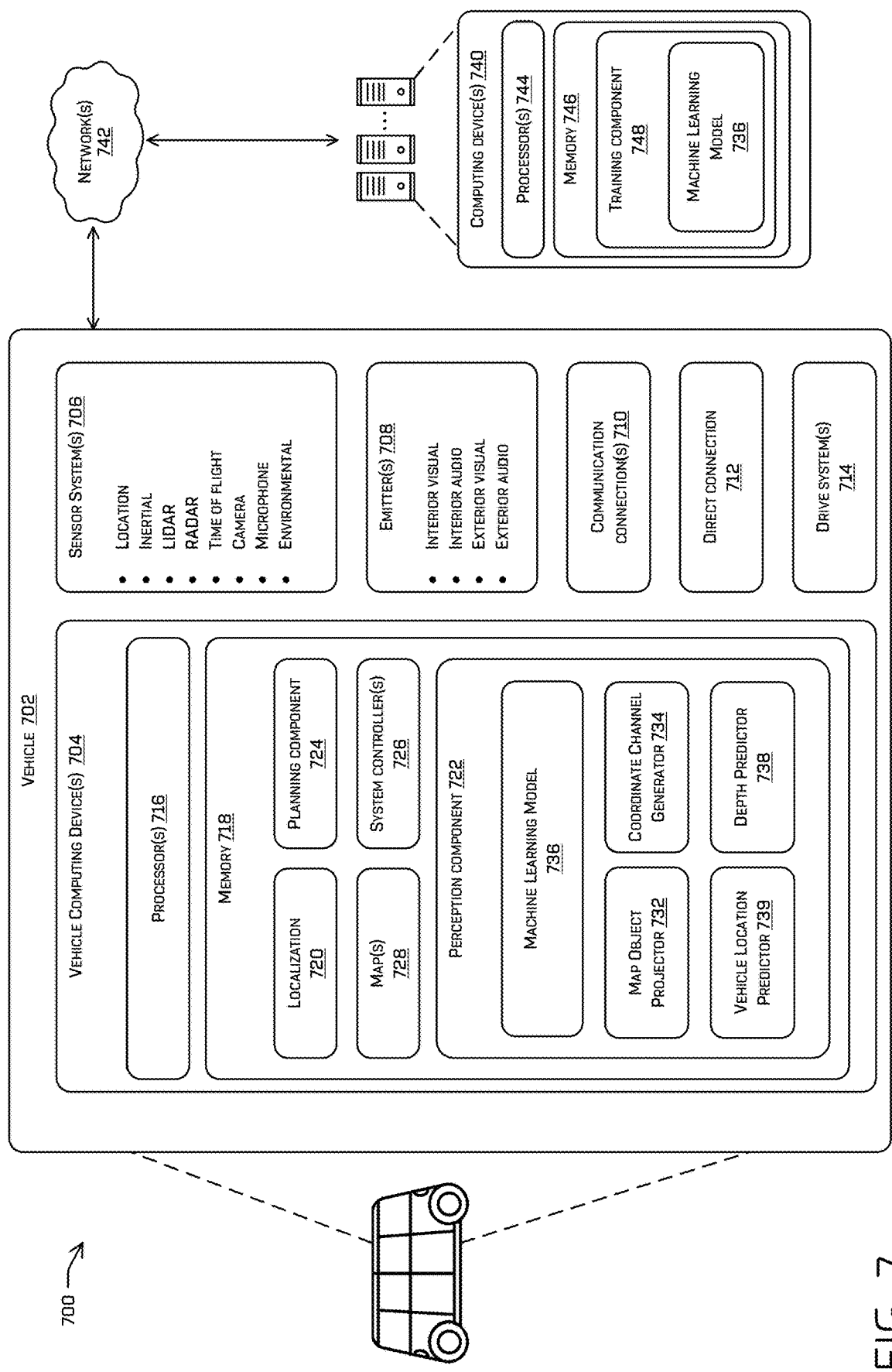
FIG. 7 depicts a block diagram of an example system for implementing the techniques described herein.

FIG. 7 depicts a block diagram of an example system 700 for implementing the techniques described herein. In at least one example, the system 700 may include a vehicle 702.

The vehicle 702 may include a vehicle computing device 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the one or more processors 716. In the illustrated example, the vehicle 702 is an autonomous vehicle; however, the vehicle 702 could be any other type of vehicle. In the illustrated example, the memory 718 of the vehicle computing device 704 stores a localization component 720, a perception component 722, a planning component 724, one or more system controllers 726, and one or more maps 728. Though depicted in FIG. 7 as residing in memory 718 for illustrative purposes, it is contemplated that the localization component 720, the perception component 722, the planning component 724, the one or more system controllers 726, and the one or more maps 728 may additionally, or alternatively, be accessible to the vehicle 702 (e.g., stored remotely).

In at least one example, the localization component 720 may include functionality to receive data from the sensor system(s) 706 to determine a position of the vehicle 702. For example, the localization component 720 may include and/or request/receive a three-dimensional map of an environment and may continuously determine a location of the autonomous vehicle within the map. In some instances, the localization component 720 may utilize SLAM (simultaneous localization and mapping) or CLAMS (calibration, localization and mapping, simultaneously) to receive image data, lidar data, radar data, IMU data, GPS data, wheel encoder data, and the like to accurately determine a location of the autonomous vehicle. In some instances, the localization component 720 may provide data to various components of the vehicle 702 to determine an initial position of an autonomous vehicle for generating a candidate trajectory.

In some instances, the perception component 722 may include functionality to perform object detection, segmentation, and/or classification. In some examples, the perception component 722 may provide processed sensor data that indicates a presence of an entity that is proximate to the vehicle 702 and/or a classification of the entity as an entity type (e.g., car, pedestrian, cyclist, building, tree, road surface, curb, sidewalk, unknown, road feature, etc.). In examples, the perception component 722 may process sensor data to identify a road feature (e.g., an intersection, parking lane, signal light, stop sign, etc.), determine a proximity of the road feature to the vehicle 702, and/or provide data regarding the road feature (e.g., proximity, etc.) as processed sensor data. In additional and/or alternative examples, the perception component 722 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the perception component 722 may include a map object projector 732 to project map objects for a vehicle environment into image data for the vehicle environment. In examples, the map object projector 732 may perform the operations of FIG. 4. In examples, the perception component 722 may include a coordinate channel generator 734 to generate one or more coordinate channels (e.g., a horizontal coordinate channel and a vertical coordinate channel) based on the projection region for a map object in the image data, for example using techniques described above for generating the first coordinate channel 122 and the second coordinate channel 132 of FIG. 1. In examples, the perception component 722 may include a vehicle location predictor 739 to determine an estimated location for the vehicle 702 in the map data for the vehicle environment, for example using received and/or determined GPS coordinates of the vehicle, and/or using the operations of FIG. 4. In examples, the perception component 722 may include a machine learning model 736 for processing input data including the coordinate channels generated by the coordinate channel generator 734 to generate model output data, for example to generate at least one of a depth map for the vehicle environment or bounding box feature data for a bounding box that is detected in the image data. In some cases, the machine learning model 736 is the machine learning model 142 of FIG. 1. In some cases, the machine learning model 736 is trained (e.g., using the operations of FIG. 6) by a training component 748 of the computing device 740 and, once trained, is deployed on the vehicle computing device 704 and as part of the perception component 722. In examples, the perception component 722 may include a depth predictor 738 to determine a depth estimate for each object detected in the vehicle environment based on the model output data generated by the machine learning model 736, such as based on at least one of a depth map for the vehicle environment or bounding box feature data for a bounding box that is detected in the image data.

In examples, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may be a sequence of waypoints for travelling between two locations. As non-limiting examples, waypoints include streets, intersections, GPS coordinates, etc. Further, the planning component 724 may generate an instruction for guiding the autonomous vehicle along at least a portion of the route from the first location to the second location. In at least one example, the planning component 724 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In at least one example, the one or more system controllers 726 may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

The memory 718 may further include the one or more maps 728 that may be used by the vehicle 702 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 728 may be divided into tiles by the vehicle computing device 704, by a computing device(s) 740, or by a combination of the two.

In some examples, the one or more maps 728 may be stored on a remote computing device(s) (such as the computing device(s) 740) accessible via network(s) 742. In some examples, multiple maps 728 may be stored based on, for example, a characteristic (e.g., type of entity, time of day, day of week, season of the year, etc.). Storing multiple maps 728 may have similar memory requirements, but increase the speed at which data in a heat map may be accessed.

In some instances, aspects of some or all of the components discussed herein may include any models, algorithms, and/or machine learning algorithms. For example, in some instances, the components in the memory 718 may be implemented as a neural network.

As described herein, an exemplary neural network passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, and/or alternatively, the sensor system(s) 706 may send sensor data, via the one or more networks 742, to the one or more computing device(s) 740 at a particular frequency, after a lapse of a predetermined period of time, in near real-time, etc.

The vehicle 702 may also include the one or more emitters 708 for emitting light and/or sound, as described above. The emitters 708 in this example include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 may also include the one or more communication connection(s) 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., other nearby vehicles, traffic signals, etc.). The communication connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as the network(s) 742. For example, the communications connection(s) 710 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include the one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 also include one or more communication connection(s) that enable communication by the respective drive module with one or more other local or remote computing device(s).

In at least one example, the localization component 720, perception component 722, and/or the planning component 724 may process sensor data, as described above, and may send their respective outputs, over the one or more network(s) 742, to the one or more computing device(s) 740. In at least one example, the localization component 720, the perception component 722, and/or the planning component 724 may send their respective outputs to the one or more computing device(s) 740 at a particular frequency, after a lapse of a predetermined period of time, in near real-time, etc.

The vehicle 702 may send sensor data to the one or more computing device(s) 740, via the network(s) 742. In some examples, the vehicle 702 may send raw sensor data to the computing device(s) 740. In other examples, the vehicle 702 may send processed sensor data and/or representations of sensor data to the computing device(s) 740. In some examples, the vehicle 702 may send sensor data to the computing device(s) 740 at a particular frequency, after a lapse of a predetermined period of time, in near real-time, etc. In some cases, the vehicle 702 may send sensor data (raw or processed) to the computing device(s) 740 as one or more log files. The computing device(s) 740 may receive the sensor data (raw or processed) and may generate and/or update maps based on the sensor data.

In examples, the vehicle 702 may generate various log file(s) representing sensor data captured by the vehicle 702. For example, a log file may include, but is not limited to, sensor data captured by one or more sensors of the vehicle 702 (e.g., lidar sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 702, decisions made by the vehicle 702, determinations made regarding segmentation and/or classification, and the like. A log files(s) may be sent to and received by the computing device(s) 740.

In at least one example, the computing device(s) 740 may include one or more processors 744 and memory 746 communicatively coupled with the one or more processors 744. In the illustrated example, the memory 746 stores a training component 748 that may train the machine learning model 736 according to any of the techniques discussed herein. The training component 748 may train the machine learning model 736 at any time, such as while offline, and then send the machine learning model 736 to the vehicle 702 over the network(s) 742 to be implemented by the vehicle 702. In some cases, once trained, the machine learning model 736 is deployed on the vehicle computing device 704, and operations of the machine learning model 736 are performed by the vehicle computing device 704. In some cases, once trained, the machine learning model 736 is deployed on the computing device 740, operations of the machine learning model 736 are performed by the computing device 740 to generate model output data, and then model output data are transmitted to the perception component 722 of the vehicle computing device 704. In some cases, the machine learning model 736 is trained in accordance with the operations of FIG. 6.

Although illustrated as being implemented on the computing device(s) 740, the training component 748 may be implemented on the vehicle 702, such as stored within the memory 718 of the vehicle computing device 704 and executed by the processor(s) 716 of the vehicle computing device 704. Further, any of the components of the vehicle computing device(s) 704 may alternatively, or additionally, be implemented by the computing device(s) 740.

The processor(s) 716 of the vehicle 702 and the processor(s) 744 of the computing device(s) 740 may be any suitable processor capable of executing instructions to process data and perform operations as described herein. By way of example and not limitation, the processor(s) 716 and 744 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 746 are examples of non-transitory computer-readable media. Memory 718 and memory 746 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 740 and/or components of the computing device(s) 740 may be associated with the vehicle 702. That is, the vehicle 702 may perform one or more of the functions associated with the computing device(s) 740, and vice versa.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 7 may utilize the processes and flows of FIGS. 1-6.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving image data from an image sensor associated with an autonomous vehicle in an environment; receiving map data associated with the environment, the map data comprising a map object; projecting, based at least in part on an estimated location of the autonomous vehicle in the map data, the map object into the image data to determine a projection region for the map object in the image data; determining, based on the estimated location of the autonomous vehicle in the map data, a coordinate channel associated with the projection region; providing model input data comprising the image data and the coordinate channel to a machine learning model; receiving, as model output data for the machine learning model, at least one of: (i) a depth map for the image data that comprises depth data for pixels of image data, or (ii) bounding box feature data for an object that is detected within the image data; and controlling the autonomous vehicle based on the model output data.

B: The system of paragraph A, wherein: the operations further comprise determining the estimated location of the autonomous vehicle within the map data, and determining the estimated location of the autonomous vehicle comprises: determining or receiving an initial estimated location for the autonomous vehicle in the map data; determining a location offset for the autonomous vehicle; and determining the estimated location based on the initial estimated location and the location offset.

C: The system of paragraph A or B, wherein: the projection region represents the map object at image coordinates within the image data, and the coordinate channel represents, for the projection region, a first location of the map object relative to a second location of the autonomous vehicle.

D: The system of any of paragraphs A-C, wherein: the projection region comprises one or more projection pixels, and the model input data comprises an object type channel that associates a projection pixel with an object type of the map object.

E: The system of any of paragraphs A-D, wherein the bounding box feature data comprise at least one of predicted coordinates for a corner of the object, predicted coordinates for a centroid of the object, or a predicted yaw measure for the object.

F: One or more non-transitory computer-readable media storing instructions executable by one or more processors, wherein the instructions, when executed, cause the one or more processors to perform operations comprising: receiving image data from an image sensor associated with a vehicle in an environment; receiving map data associated with the environment, the map data comprising a map object; determining an estimated location of the vehicle in the map data; projecting the map object into the image data to determine a projection region for the map object in the image data; and determining, based on the image data, at least one of: (i) a depth map for the image data, or (ii) bounding box feature data for an object that is detected within the image data.

G: The one or more non-transitory computer-readable media of paragraph F, wherein: the projection region represents the map object at image coordinates within the image data, at least one of the depth map or the bounding box feature data is determined based on a coordinate channel, and the coordinate channel represents, for the projection region, a first location of the map object relative to a second location of the vehicle.

H: The one or more non-transitory computer-readable media of paragraph F or G, wherein the map object corresponds to a roadway object type comprising one or more of: a lane marking; a road sign; a traffic light; a crosswalk marking; or a stop line.

I: The one or more non-transitory computer-readable media of any of paragraphs F-H, wherein the map object is associated with a first roadway object that is located on the ground and in between the vehicle and the object.

J: The one or more non-transitory computer-readable media of any of paragraphs F-I, wherein: determining the estimated location of the vehicle comprises: determining or receiving an initial estimated location for the vehicle in the map data; determining a location offset for the vehicle; and determining the estimated location based on the initial estimated location and the location offset.

K: The one or more non-transitory computer-readable media of paragraph J, wherein determining the location offset comprises: determining an expected semantic segmentation based on the map data and the initial estimated location; determining an observed semantic segmentation based on the image data; and determining the location offset using a convex optimization operation and based on the expected semantic segmentation and the observed semantic segmentation.

L: The one or more non-transitory computer-readable media of paragraph J or K, wherein: the location offset is determined based on an inaccuracy measure for a historical estimated location for the vehicle, and the inaccuracy measure is determined based on the historical estimated location and a ground-truth location for a time associated with the historical estimated location.

M: The one or more non-transitory computer-readable media of any of paragraphs F-L, wherein the depth map comprises a depth estimation for pixels of the image data.

N: The one or more non-transitory computer-readable media of any of paragraphs F-M, wherein: the projection region comprises one or more projection pixels, and at least one of the depth map or the bounding box feature data is determined based on an object type channel that associates a projection pixel with an object type of the map object.

O: The one or more non-transitory computer-readable media of any of paragraphs F-N, wherein the bounding box feature data comprise at least one of predicted coordinates for a corner of the object, predicted coordinates for a centroid of the object, or a predicted yaw measure for the object.

P: The one or more non-transitory computer-readable media of any of paragraphs F-O, wherein the image data comprises monocular image data without corresponding measured depth data.

Q: The one or more non-transitory computer-readable media of any of paragraphs F-P, wherein projecting the map object into the image data is performed based on a first pixel of the image data that corresponds to ground.

R: The one or more non-transitory computer-readable media of any of paragraphs F-Q, wherein the operations further comprise: controlling the vehicle based on at least one of the depth map or the bounding box feature data.

S: A method comprising: receiving image data from an image sensor associated with a vehicle in an environment; receiving map data associated with the environment, the map data comprising a map object; determining an estimated location of the vehicle within the map data; projecting the map object into the image data to determine a projection region for the map object in the image data; and determining, based on the image data, at least one of: (i) a depth map for the image data, or (ii) bounding box feature data for an object that is detected within the image data.

T: The method of paragraph S, wherein: the projection region represents the map object at image coordinates within the image data, at least one of the depth map or the bounding box feature data is determined based on a coordinate channel, and the coordinate channel represents, for the projection region, a first location of the map object relative to a second location of the vehicle.

What is claimed is:

1. A system comprising:
   one or more processors; and
   one or more non-transitory computer-readable media storing computer-executable instructions that, when executed, cause the one or more processors to perform operations comprising:
   receiving image data from an image sensor associated with an autonomous vehicle in an environment;
   receiving map data associated with the environment, the map data comprising a map object;
   projecting, based at least in part on an estimated location of the autonomous vehicle in the map data, the map object into the image data to determine a projection region for the map object in the image data;
   determining, based on the estimated location of the autonomous vehicle in the map data, a coordinate channel associated with the projection region;
   providing model input data comprising the image data and the coordinate channel to a machine learning model;
   receiving, as model output data for the machine learning model, at least one of: (i) a depth map for the image data that comprises depth data for pixels of image data, or (ii) bounding box feature data for an object that is detected within the image data; and
   controlling the autonomous vehicle based on the model output data.

2. The system of claim 1, wherein:
   the operations further comprise determining the estimated location of the autonomous vehicle within the map data, and
   determining the estimated location of the autonomous vehicle comprises:
   determining or receiving an initial estimated location for the autonomous vehicle in the map data;
   determining a location offset for the autonomous vehicle; and
   determining the estimated location based on the initial estimated location and the location offset.

3. The system of claim 1, wherein:
   the projection region represents the map object at image coordinates within the image data, and
   the coordinate channel represents, for the projection region, a first location of the map object relative to a second location of the autonomous vehicle.

4. The system of claim 1, wherein:
   the projection region comprises one or more projection pixels, and
   the model input data comprises an object type channel that associates a projection pixel with an object type of the map object.

5. The system of claim 1, wherein the bounding box feature data comprise at least one of predicted coordinates for a corner of the object, predicted coordinates for a centroid of the object, or a predicted yaw measure for the object.

6. One or more non-transitory computer-readable media storing instructions executable by one or more processors, wherein the instructions, when executed, cause the one or more processors to perform operations comprising:
   receiving image data from an image sensor associated with a vehicle in an environment;
   receiving map data associated with the environment, the map data comprising a map object;
   determining an estimated location of the vehicle in the map data;
   projecting the map object into the image data to determine a projection region for the map object in the image data; and
   determining, based on the image data, at least one of: (i) a depth map for the image data, or (ii) bounding box feature data for an object that is detected within the image data.

7. The one or more non-transitory computer-readable media of claim 6, wherein:
   the projection region represents the map object at image coordinates within the image data,
   at least one of the depth map or the bounding box feature data is determined based on a coordinate channel, and
   the coordinate channel represents, for the projection region, a first location of the map object relative to a second location of the vehicle.

8. The one or more non-transitory computer-readable media of claim 6, wherein the map object corresponds to a roadway object type comprising one or more of:
- a lane marking;
- a road sign;
- a traffic light;
- a crosswalk marking; or
- a stop line.

9. The one or more non-transitory computer-readable media of claim 6, wherein the map object is associated with a first roadway object that is located on the ground and in between the vehicle and the object.

10. The one or more non-transitory computer-readable media of claim 6, wherein:
   determining the estimated location of the vehicle comprises:
      determining or receiving an initial estimated location for the vehicle in the map data;
      determining a location offset for the vehicle; and
      determining the estimated location based on the initial estimated location and the location offset.

11. The one or more non-transitory computer-readable media of claim 10, wherein determining the location offset comprises:
   determining an expected semantic segmentation based on the map data and the initial estimated location;
   determining an observed semantic segmentation based on the image data; and
   determining the location offset using a convex optimization operation and based on the expected semantic segmentation and the observed semantic segmentation.

12. The one or more non-transitory computer-readable media of claim 10, wherein:
   the location offset is determined based on an inaccuracy measure for a historical estimated location for the vehicle, and
   the inaccuracy measure is determined based on the historical estimated location and a ground-truth location for a time associated with the historical estimated location.

13. The one or more non-transitory computer-readable media of claim 6, wherein the depth map comprises a depth estimation for pixels of the image data.

14. The one or more non-transitory computer-readable media of claim 6, wherein:
   the projection region comprises one or more projection pixels, and
   at least one of the depth map or the bounding box feature data is determined based on an object type channel that associates a projection pixel with an object type of the map object.

15. The one or more non-transitory computer-readable media of claim 6, wherein the bounding box feature data comprise at least one of predicted coordinates for a corner of the object, predicted coordinates for a centroid of the object, or a predicted yaw measure for the object.

16. The one or more non-transitory computer-readable media of claim 6, wherein the image data comprises monocular image data without corresponding measured depth data.

17. The one or more non-transitory computer-readable media of claim 6, wherein projecting the map object into the image data is performed based on a first pixel of the image data that corresponds to ground.

18. The one or more non-transitory computer-readable media of claim 6, wherein the operations further comprise:
   controlling the vehicle based on at least one of the depth map or the bounding box feature data.

19. A method comprising:
   receiving image data from an image sensor associated with a vehicle in an environment;
   receiving map data associated with the environment, the map data comprising a map object;
   determining an estimated location of the vehicle within the map data;
   projecting the map object into the image data to determine a projection region for the map object in the image data; and
   determining, based on the image data, at least one of: (i) a depth map for the image data, or (ii) bounding box feature data for an object that is detected within the image data.

20. The method of claim 19, wherein:
   the projection region represents the map object at image coordinates within the image data,
   at least one of the depth map or the bounding box feature data is determined based on a coordinate channel, and
   the coordinate channel represents, for the projection region, a first location of the map object relative to a second location of the vehicle.

* * * * *